(12) United States Patent
Heo et al.

(10) Patent No.: US 10,175,449 B2
(45) Date of Patent: Jan. 8, 2019

(54) CAMERA MODULE AND CONTROL METHOD THEREOF

(71) Applicant: SAMSUNG ELECTRO-MECHANICS CO., LTD., Suwon-si, Gyeonggi-do (KR)

(72) Inventors: Hoon Heo, Suwon-si (KR); Yong-Joon Park, Suwon-si (KR); Jung-Wook Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 87 days.

(21) Appl. No.: 14/047,890

(22) Filed: Oct. 7, 2013

(65) Prior Publication Data
US 2014/0104710 A1    Apr. 17, 2014

(30) Foreign Application Priority Data

Oct. 11, 2012  (KR) ......................... 10-2012-0113095

(51) Int. Cl.
*G02B 7/09*    (2006.01)
*G02B 7/08*    (2006.01)

(52) U.S. Cl.
CPC ............. *G02B 7/09* (2013.01); *G02B 7/08* (2013.01)

(58) Field of Classification Search
CPC ... G02B 7/04; G02B 7/08; G02B 7/09; G02B 7/102; G02B 7/28; G02B 7/282; G02B 7/005; H04N 5/23212
(Continued)

(56) References Cited

U.S. PATENT DOCUMENTS

| 8,014,091 B2 | 9/2011 | Kang et al. |
| 2005/0258822 A1* | 11/2005 | Hara et al. ................. 324/207.2 |

(Continued)

FOREIGN PATENT DOCUMENTS

| CN | 1731233 A | 2/2006 |
| CN | 1860397 A | 11/2006 |

(Continued)

OTHER PUBLICATIONS

Chinese Office Action dated Mar. 30, 2017, in counterpart Chinese Application No. 201310473156.7 (12 pages in English, 8 pages in Chinese).

(Continued)

*Primary Examiner* — Ricky Mack
*Assistant Examiner* — Gary O'Neill
(74) *Attorney, Agent, or Firm* — NSIP Law

(57) ABSTRACT

A camera module including a housing; a lens barrel having a lens and reciprocating in the housing; a magnetic member coupled with the lens barrel; an electromagnetic member coupled with the housing and generating a magnetic field so that the lens barrel moves along an optical axis; and a Hall sensor in the housing and detecting a change in magnetic field according to a position of the magnetic member before electric power is outputted to the electromagnetic member. A control unit sets a current position of the magnetic member as a first target position, setting an initial position for driving auto focusing as a second target position, aligning the lens barrel to the first target position by controlling electric power supplied to the electromagnetic member, and then moving the lens barrel to the second target position by supplying electric power to the electromagnetic member.

9 Claims, 4 Drawing Sheets

(58) Field of Classification Search
USPC ............ 359/823, 824; 348/208.12, 345–356, 348/357, 208.4, 208.7, 208.11; 396/77–82, 89, 93
See application file for complete search history.

(56) References Cited

U.S. PATENT DOCUMENTS

| | | | |
|---|---|---|---|
| 2006/0028742 A1 | 2/2006 | Yamashita et al. | |
| 2007/0273364 A1 | 11/2007 | Takei et al. | |
| 2009/0085558 A1* | 4/2009 | David | G01D 5/145 324/207.2 |
| 2010/0053784 A1* | 3/2010 | Kang | G02B 7/102 359/824 |
| 2010/0127655 A1* | 5/2010 | Ward et al. | 318/621 |
| 2012/0092551 A1* | 4/2012 | Ohishi | G02B 7/08 348/374 |
| 2012/0154938 A1* | 6/2012 | Ohishi | G02B 7/08 359/824 |
| 2013/0321938 A1* | 12/2013 | Ohno | 359/824 |

FOREIGN PATENT DOCUMENTS

| | | |
|---|---|---|
| CN | 101743743 A | 6/2010 |
| CN | 102224467 A | 10/2011 |
| CN | 102445744 A | 5/2012 |
| JP | 2012-83582 A | 4/2012 |
| KR | 10-2010-0026882 A | 3/2010 |
| KR | 10-2010-0082829 A | 7/2010 |
| WO | WO 2009/011547 A1 | 1/2009 |
| WO | WO 2009/045680 A2 | 4/2009 |
| WO | WO 2010/062450 A1 | 6/2010 |

OTHER PUBLICATIONS

Korean Office Action dated Nov. 19, 2016 in counterpart Korean Patent Application No. 10-2012-0113095 (17 pages, with English translation).

* cited by examiner

CAMERA MODULE AND CONTROL METHOD THEREOF

CROSS-REFERENCE TO RELATED APPLICATIONS

This application claims the benefit of Korean Patent Application No. 10-2012-0113095, filed with the Korean Intellectual Property Office on Oct. 11, 2012, the disclosure of which is incorporated herein by reference in its entirety.

BACKGROUND

1. Technical Field

The present invention relates a camera module and a control method thereof.

2. Background Art

Today's mobile communication terminals are equipped with various functions, such as photography and video chat, in addition to delivering voice signals. For this, it has become practically essential that the small camera module mounted in the mobile communication terminal has the auto focusing (AF) function. The AF driving function of the AF cameral module is handled by an actuator inside the camera.

The actuator is supplied with electric power to move the lens barrel in which the lens is installed. When electric power is initially supplied to the camera module, the actuator can possibly make the lens barrel collide with other parts such as the housing (which houses the lens barrel), a coil attached to the housing or a Hall sensor attached inside of the housing, while moving the lens barrel initially for driving the AF function. This phenomenon can cause not only a "tick" noise but also damage by collision between the lens barrel and other parts collided, in the camera module, when the power is turned on. Accordingly, a measure is demanded to prevent the damage and remove the noise during the initial moving of the lens barrel when the AF function of the camera module is driven.

The related art of the present invention is disclosed in Korea Patent Publication No. 2006-0088155 (AN APPARATUS AND METHOD FOR LENS' POSITION CONTROL OF CAMERA MODULE; laid open on Aug. 4, 2006).

SUMMARY

The present invention provides a camera module and a method of controlling the camera module that can prevent damage and remove noise when a lens barrel is initially moved.

The camera module in accordance with an embodiment of the present invention includes: housing having a hollow portion formed therein; a lens barrel having a lens therein and configured to reciprocate in the hollow portion of the housing; a magnetic member coupled with the lens barrel; an electromagnetic member coupled with the housing and configured to generate a magnetic field with the magnetic member so that the lens barrel moves along an optical axis; a Hall sensor installed in the housing and configured to detect a change in magnetic field according to a position of the magnetic member but to detect a position of the magnetic member before electric power is outputted to the electromagnetic member; and a control unit configured to set a current position of the magnetic member as a first target position, set an initial position for driving auto focusing as a second target position, align the lens barrel to the first target position by controlling electric power supplied to the electromagnetic member, and then move the lens barrel to the second target position by supplying electric power to the electromagnetic member.

The method of controlling a camera module in accordance with an embodiment of the present invention includes: supplying electric power to a driver configured to supply electric current to an electromagnetic member; turning off an output to the electromagnetic member by controlling the driver; checking a position of a magnetic member by receiving an output signal from a Hall sensor configured to detect the position of the magnetic member coupled with a lens barrel; setting a current position of the magnetic member as a first target position and aligning the lens barrel to the first target position by controlling the driver and turning on the output to the electromagnetic member; and setting an initial position for driving auto focusing as a second target position and moving the lens barrel aligned to the first target position to the second target position by controlling the driver.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain technology is determined to evade the point of the present invention, the pertinent detailed description will be omitted.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, a camera module and a control method thereof in accordance with an embodiment of the present invention will be described with reference to FIG. 1 to FIG. 6.

Figure 1:
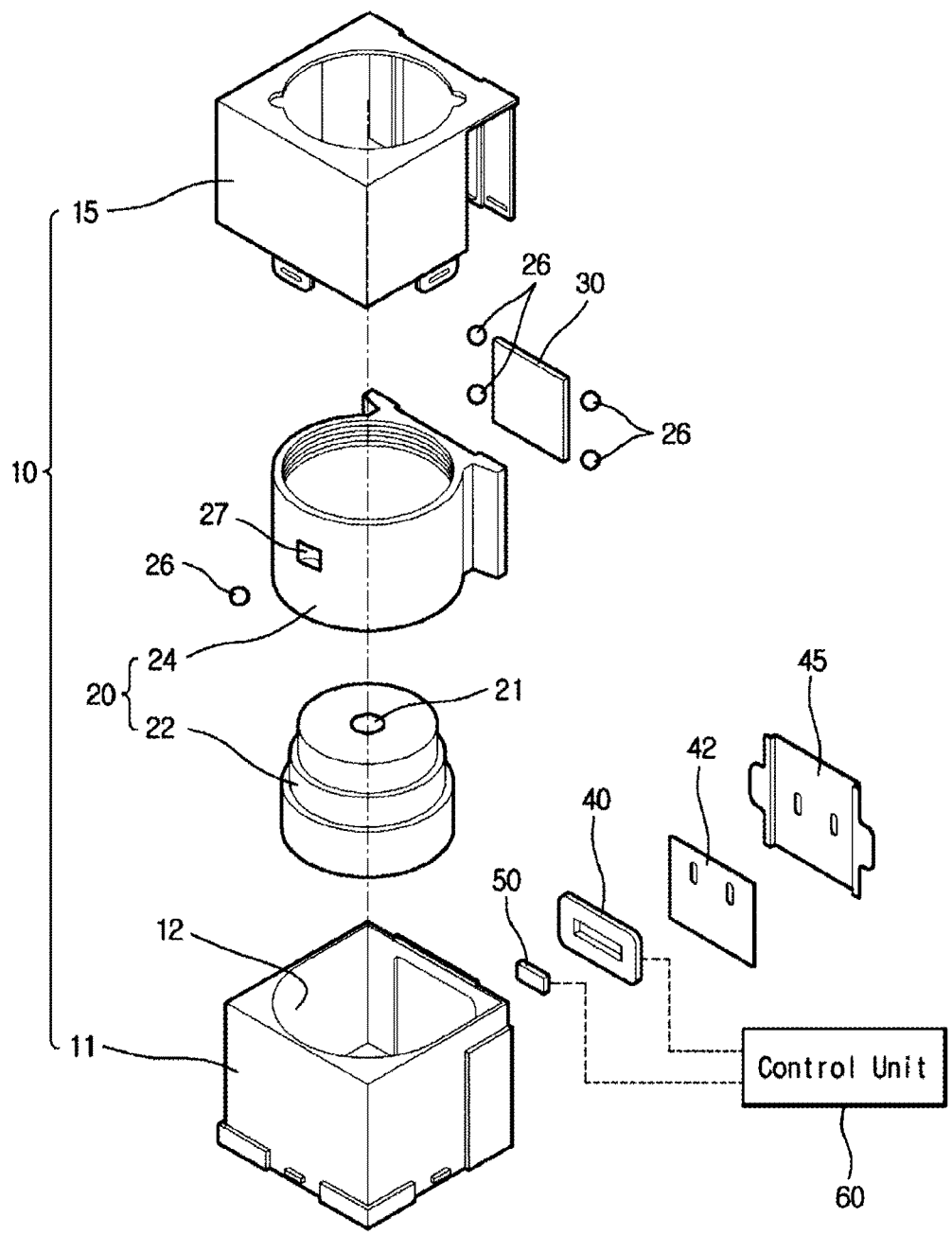
FIG. 1 is an example of an exploded perspective view showing a camera module to which an embodiment of the present invention can be possibly applied.

FIG. 1 is an exploded perspective view of a camera module in accordance with an embodiment of the present invention.

Referring to FIG. 1, a camera module in accordance with an embodiment of the present invention includes housing 10, a lens module 20, a magnetic member 30, an electromagnetic member 40, a Hall sensor 50 and a control unit 60.

The housing 10 houses various parts that constitute the camera module. To achieve this, the housing 10 has a hollow portion 12 formed inside thereof. Here, the housing 10 can house the lens module 20 in the hollow portion 12 in such a way that the lens module 20 can move reciprocally. In other words, the hollow portion 12 can be formed to allow the lens module 20 to move reciprocally. Moreover, the housing 10 can house the magnetic member 40 and the Hall sensor 50 in the hollow portion 12. Said housing 10 can be divided into a first housing member 11 and the second housing member 15 so as to facilitate installation of the lens module 20.

The lens module 20 includes a lens barrel 22, which houses and supports a lens 21 inside thereof, and a bobbin 24, to which the magnetic member 30 is coupled.

The lens barrel 22 supports the lens 21, which makes light incident upon an image forming part, such as film or an image sensor. Here, the lens barrel 220 can be formed movably along an optical axis in order to adjust focus of the image forming part and the lens 21. For example, the lens barrel 22 can be formed in the shape of a column, and the lens 21 can be arranged along a center line of the column shape. Particularly, the lens module 20 is coupled with the lens 21 and reciprocates in the hollow portion 12 in order to move the lens 21 during auto focusing (AF).

In the lens module 20, the lens barrel 22, which supports the lens 21, and the bobbin 24, in which the magnetic member 30 is installed, are coupled with each other. Through this configuration, the lens module 20 can move the lens 21 using magnetic force applied to the magnetic member 30.

Here, the lens module 20 can move smoothly within the hollow portion 12 of the housing 10 using ball bearing 26 interposed between the bobbin 24 and the housing 10. Formed for this can be a bearing groove 27, in which the ball bearing 26 is securely received, in the bobbin 24 of the lens module 20.

The magnetic member 30 is made of a magnetic material that generates a magnetic field. Here, the magnetic member 30 can be mounted on the bobbin 24 of the lens module 20. The magnetic member 30 interacts with the electromagnetic member 40 to be powered for moving the lens module 20.

The electromagnetic member 40 generates a magnetic field that interacts with the magnetic field of the magnetic member 30. Here, the electromagnetic member 40 can adjust the magnetic field by adjusting electrical energy and thus can adjust the force applied to the magnetic member 30. Accordingly, by adjusting the electrical energy supplied to the electromagnetic member 40 mounted in the housing 10, the lens module 20 can be disposed at a desired location in the hollow portion 12 of the housing 10. For this, the electromagnetic member 40 is disposed to face the magnetic member 30 in the housing 10. Moreover, the size of the magnetic field of the electromagnetic member 40 is varied by the size of current supplied. Said electromagnetic member 40 can be coupled with a yoke 45 to be installed in the housing 10.

The Hall sensor 50 detects a change in magnetic field to generate an output signal as a voltage based on the Hall effect. The Hall sensor 50 is disposed adjacently to the magnetic member 30 and thus can indicate the change in magnetic field caused by a position change of the magnetic member 30 as an output voltage. Accordingly, the Hall sensor 50 can indicate the position of the lens 21 based on the position of the magnetic member 30 through the output signal.

The Hall sensor 50 is arranged in the housing 10 to face the magnetic member 30. Since the Hall sensor 50 is arranged to face the magnetic member 30, the change in magnetic field caused by the movement of the magnetic member 30 is shown to be almost linear. In other words, the output signal of the Hall sensor 50 has a linear proportional relation with the moved position of the magnetic member 30. Accordingly, it becomes easy to assess the position of the magnetic member 30 through the output signal of the Hall sensor 50. Said Hall sensor 50 can be coupled with the yoke 45 to be installed in the housing 10.

The yoke 45 supports and couples the electromagnetic member 40 and the Hall sensor 50 to the housing 10. Moreover, the yoke 45 can prevent the magnetic field of the electromagnetic member 40 required for movement of the magnetic member 30 from being leaked out to an outside. The yoke 45 can also prevent magnetic field from flowing in from the outside, thereby preventing the Hall sensor 50 from being disturbed.

The control unit 60 controls the electromagnetic member 40 in correspondence with the output signal of the Hall sensor 50.

Hereinafter, the control unit 60 in accordance with an embodiment of the present invention will be described in detail with reference to FIG. 2.

Figure 2:
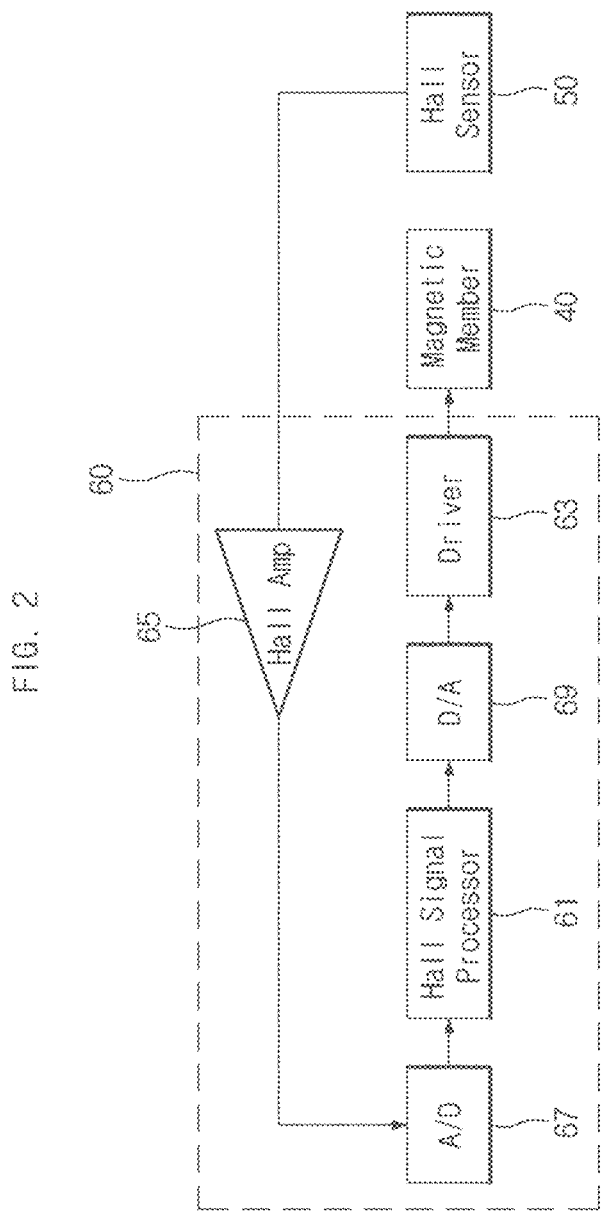
FIG. 2 is a block diagram showing a control unit in accordance with an embodiment of the present invention.

FIG. 2 is a block diagram showing the control unit in accordance with an embodiment of the present invention.

Referring to FIG. 2, the control unit 60 in accordance with an embodiment of the present invention includes a Hall signal processor 61 and a driver 63.

The control unit 60 uses the output voltage of the Hall sensor 50 to assess the position of the magnetic member 30. Moreover, the control unit 60 can assess the position of the lens module 30 through the position of the magnetic member 30. The control unit 60 can also compute the size of current for moving the lens barrel 22 to a desired position by checking the position of the magnetic member 30.

Moreover, the control unit 60 supplies current required for allowing the driver 63 to move the magnetic member 30. Accordingly, the lens module 20 coupled with the magnetic member 30 is moved to a new position, and an output signal of the Hall sensor 50 corresponding to the new position of the lens module 20 is inputted to the control unit 60 again.

Therefore, auto focusing can be precisely controlled because the lens 21 can be positioned at a precise position by feeding back the supply of current to the electromagnetic member 40 until the lens 21 is positioned at a desired position, i.e., a position of focus. Moreover, it is possible to maintain the position of the lens 21 through the Hall sensor 50 and the control unit 60.

The control unit 60 in accordance with an embodiment of the present invention can further include an amplifier 65 configured for facilitating signal processing by amplifying an output signal, i.e., the output voltage, of the Hall sensor 50, an A/D converter 67 configured to covert the output voltage, which is an analog signal, of the Hall sensor 50 to a digital signal, and a D/A converter 69 configured for generating analog voltage required for driving the driver 63 in correspondence with the processed digital signal.

The control unit 60 in accordance with an embodiment of the present invention sets a current position of the magnetic member 30 as a first target position and an initial position for driving auto focusing as a second target position. After the control unit 60 aligns the lens barrel 22 to the first target position by controlling electric power supplied to the electromagnetic member 40, the control unit 60 moves the lens barrel 22 to the second target position by applying electric power to the electromagnetic member 40.

Here, after turning off an output to the electromagnetic member 40 by applying electric power to the driver 63 and controlling the driver 63 in order to drive the auto focusing, the control unit 60 can check the position of magnetic member 30 by receiving a signal resulted from detecting the position of the magnetic member 30 from the Hall sensor 50. The control unit 60 can use the A/D converter 67 to convert the output signal of the Hall sensor 50 and check the position of the magnetic member 30 from the converted output signal. Moreover, after checking the position of the magnetic member 30, the control unit 60 can control the driver 63 to turn on the output to the electromagnetic member 40 and can use the magnetic field between the electromagnetic member 40 and the magnetic member 30 to align the lens barrel 22 to the first target position.

Hereinafter, a control method for moving a camera module to an initial position for driving auto focusing by use of the above-described camera module will be described.

Figure 3:
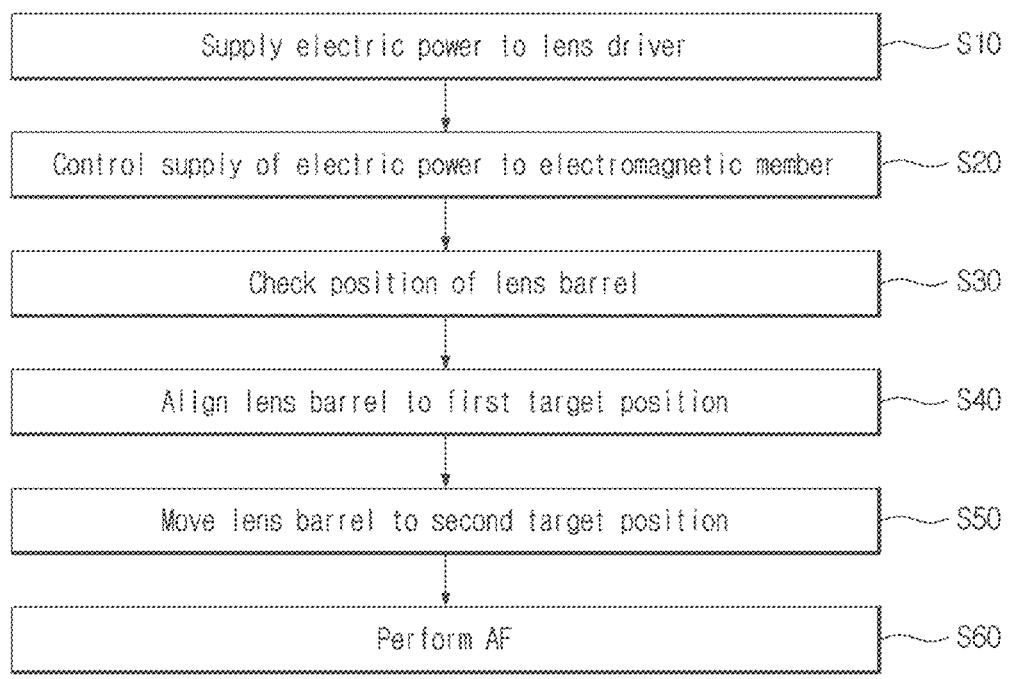
FIG. 3 is a flow diagram showing a method of controlling the camera module in accordance with an embodiment of the present invention.
Figure 4:
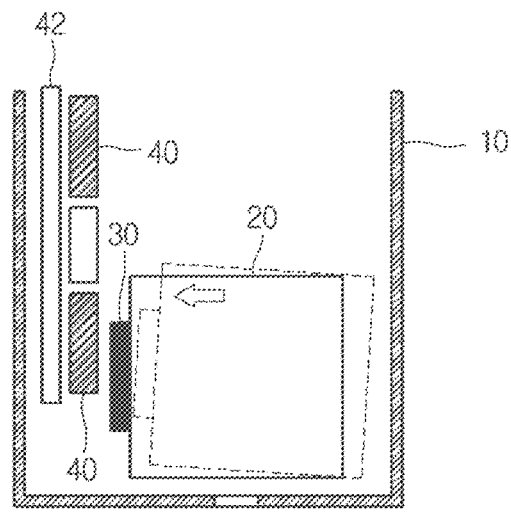
FIG. 4 is a cross-sectional view illustrating step S40 shown in FIG. 3.
Figure 5:
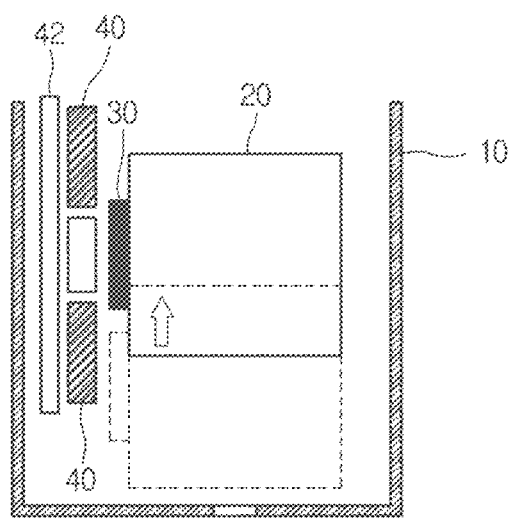
FIG. 5 is a cross-sectional view illustrating step S50 shown in FIG. 3.

FIG. 3 is a flow diagram showing a method of controlling the camera module in accordance with an embodiment of the present invention. FIG. 4 is a cross-sectional view illustrating step S40 shown in FIG. 3. FIG. 5 is a cross-sectional view illustrating step S50 shown in FIG. 3.

First, electric power is applied to the driver 63 of the control unit 60 in order to drive auto focusing (S10).

Next, power supply to the electromagnetic member 40 is controlled (S20). Specifically, the control unit 60 cuts off the electric power supplied to the electromagnetic member 40 from the driver 63 to turn the electromagnetic member 40 off.

Then, the position of the lens barrel 22 is searched (S30). Specifically, the control unit 60 can check the position of the magnetic member 30 by receiving an output signal from the Hall sensor 50 that detects the position of the magnetic member 30 coupled to the lens barrel 22. Here, while the output to the electromagnetic member 40 is turned off by controlling the driver 63, the control unit 60 can use the A/D converter 67 to convert the output signal of the Hall sensor 50 to a digital signal and check the position of the magnetic member from the converted output signal.

Afterwards, as illustrated in FIG. 4, the control unit 60 sets the current position of the magnetic member 30 as the first target position and controls the driver 63 to turn on the output to the electromagnetic member 40 and align the lens barrel 22 to the first target position (S40). Here, the control unit 60 can set a current position code value of the lens barrel 22 that is generally tilted to one side as the first target position and input the current position code value in a driving target register of the driver 63 to align the lens barrel 22 to the first target position. Accordingly, the lens barrel 22 can be aligned in parallel with the electromagnetic member 40 installed in the housing 10 while being arbitrarily tilted by, for example, gravity within the housing 10.

Then, as illustrated in FIG. 5, the control unit 60 sets the initial position for driving auto focusing as the second target position and controls the driver 63 to move the lens barrel 22 aligned with the first target position to the second target position (S50). Here, the control unit 60 can input a position code value corresponding to the second target position in the driving target register of the driver 63 and supply electric current to the electromagnetic member 40 to move the lens barrel 22 aligned in parallel with the electromagnetic member 40 in the housing 10 to the second target position. The lens barrel 22 maintains a predetermined gap with the electromagnetic member 40 when moving to the second target position.

After aligning the lens barrel 22 to the first target position, the control unit 60 can move the lens barrel 22 to the second target position to prevent the electromagnetic member 40, which may include a Hall sensor, and the magnetic member 30 from colliding with each other when electric power is applied for driving auto focusing. Through this, the control unit 60 can eliminate an approach noise resulted from collision between the electromagnetic member 40 and the magnetic member 30 and prevent damages to the electromagnetic member 40 and the magnetic member 30.

Then, the control unit 60 controls the lens barrel 22 moved to the initial position for driving auto focusing to carry out auto focusing (S70).

As the auto focusing is performed by aligning the lens barrel to the first target position and then moving the lens barrel to the second target position, the camera module and the control method thereof in accordance with an embodiment of the present invention can eliminate the approach noise caused by collision between the electromagnetic member and the magnetic member when electric power is initially supplied and prevent damages to the electromagnetic member and the magnetic member.

Although a certain embodiment of the present invention has been described, it shall be appreciated that there can be a very large number of permutations and modification of the present invention by those who are ordinarily skilled in the art to which the present invention pertains without departing from the technical ideas and boundaries of the present invention, which shall be defined by the claims appended below.

It shall be also appreciated that many other embodiments other than the embodiment described above are included in the claims of the present invention.

What is claimed is:

1. A camera module, comprising:
   a housing having a hollow portion formed therein;
   a lens barrel having a lens therein and configured to reciprocate in the hollow portion of the housing;
   a magnetic member coupled with the lens barrel;
   an electromagnetic member coupled with the housing and configured to generate a magnetic field with the magnetic member so that the lens barrel moves along an optical axis;
   a Hall sensor disposed adjacent to the magnetic member and installed in the housing, the Hall sensor is configured to detect a change in magnetic field according to a position of the magnetic member and to detect a position of the magnetic member before electric power is outputted to the electromagnetic member, and is further configured to output a signal indicating a position of the lens barrel based on the position of the magnetic member; and
   a control unit configured to
      set a current position of the magnetic member as a first target position,
      set an initial position for auto focusing as a second target position,
      move the lens barrel to the first target position using an electromagnetic power between the magnetic member and the electromagnetic member by controlling electric power supplied to the electromagnetic member,
      align the lens barrel in parallel with the optical axis, while the lens barrel is in the first target position, to prevent the lens barrel from moving in a direction orthogonal to the optical axis during consecutive movements of the lens barrel along the optical axis, using an electromagnetic power between the magnetic member and the electromagnetic member by controlling electric power supplied to the electromagnetic member, and after the lens barrel is aligned in parallel with the optical axis in the first target position, move the lens barrel to the second target position along the optical axis by controlling electric power supplied to the electromagnetic member.

2. The camera module of claim 1, wherein the control unit comprises:
   a Hall signal processor configured to receive the output signal according to detection of position by the Hall sensor to check the position of the magnetic member;
   a driver configured to supply electric power to the electromagnetic member to generate a magnetic field between the electromagnetic member and the magnetic member;
   an A/D converter configured to convert the output signal of the Hall sensor to a digital signal and transfer the converted digital signal to the Hall signal processor; and
   a D/A converter configured to generate analog voltage required for driving the driver in correspondence with the digital signal processed by the Hall signal processor.

3. The camera module of claim 2, wherein the control unit is configured to check the position of the magnetic member by turning off an output to the electromagnetic member by supplying electric power to the driver for driving the auto focusing and controlling the driver and then by receiving a signal resulting from detecting the position of the magnetic member from the Hall sensor.

4. The camera module of claim 3, wherein the control unit is configured to convert the output signal of the Hall sensor by using the A/D converter and to check the position of the magnetic member from the converted output signal.

5. The camera module of claim 3, wherein the control unit is configured to turn on the output to the electromagnetic member by checking the position of the magnetic member and then controlling the driver and to align the lens barrel to the first target position using the magnetic field between the electromagnetic member and the magnetic member.

6. The camera module of claim 5, wherein the control unit is configured to move the lens barrel to the second target position by aligning the lens barrel and then inputting a position value corresponding to the second target position in the driver.

7. A method of controlling a camera module configured for driving auto focusing, the method comprising:
   supplying electric power to a driver configured to supply electric current to an electromagnetic member;
   turning off an output to the electromagnetic member by controlling the driver;
   checking a position of a magnetic member by receiving an output signal from a Hall sensor disposed adjacent to the magnetic member, and configured to detect the position of the magnetic member that is coupled with a lens barrel, and is further configured to output a signal indicating a position of the lens barrel based on the position of the magnetic member;
   setting a current position of the magnetic member as a first target position;
   setting an initial position for driving auto focusing as a second target position,
   moving the lens barrel to the first target position using an electromagnetic power between the magnetic member and the electromagnetic member by controlling the driver and turning on the output to the electromagnetic member;
   aligning the lens barrel in parallel with the optical axis, while the lens barrel is in the first target position, using an electromagnetic power between the magnetic member and the electromagnetic member by controlling electric power supplied to the electromagnetic member to prevent the lens barrel from moving in a direction orthogonal to the optical axis during consecutive movements of the lens barrel along the optical axis; and
   after the aligning of the lens barrel in parallel with the optical axis in the first target position, moving the lens barrel to the second target position by controlling the driver.

8. The method of claim 7, wherein the checking of the position of the magnetic member comprises converting the output signal of the Hall sensor to a digital signal by use of an A/D converter while the output to the electromagnetic member is turned off by controlling the driver, and checking the position of the magnetic member from the converted output signal.

9. The method of claim 7, wherein the electromagnetic member adjusts the force applied to the magnetic member.

* * * * *